April 30, 1968 M. SAPOFF ET AL 3,381,253

HIGH SPEED WIDE RANGE SURFACE SENSOR THERMISTOR

Filed March 4, 1966

INVENTORS
MEYER SAPOFF
BARRY B. JACOBS
BY JOHN G. FROEMEL

Albert Kronman
ATTORNEY

United States Patent Office 3,381,253
Patented Apr. 30, 1968

3,381,253
HIGH SPEED WIDE RANGE SURFACE SENSOR THERMISTOR
Meyer Sapoff, West Orange, Barry B. Jacobs, Union, and John G. Froemel, Verona, N.J., assignors to Victory Engineering Corporation, Springfield, N.J., a corporation of Delaware
Filed Mar. 4, 1966, Ser. No. 531,859
8 Claims. (Cl. 338—22)

ABSTRACT OF THE DISCLOSURE

A temperature sensing assembly for surface sensing in which the sensing thermistor and a portion of its leads are covered by a non-metallic envelope having a coefficient of thermal expansion close to a metallic plate to which it is fused so that the thermistor will retain its close thermal association with the plate over many cycles of expansion and contraction. Alternately, intermediate layers of fusing material having a suitable coefficient of thermal expansion are employed between the thermistor and plate.

This invention relates to thermistors and particularly to thermistors used for sensing surface temperatures over a wide temperature range.

The relatively high temperature coefficients exhibited by semiconductor thermistors, such as those of the metal-oxide class, makes them particularly useful in the measurement of physical and environmental conditions, such as temperature, thermal conductivity and the flow of various fluids, in which temperature or a change in temperature may be related to the phenomenon under observation. In order to prevent drift in the electrical characteristics of these components, due to reaction with an oxidizing or reducing atmosphere, it is customary to hermetically seal the thermistors in glass to achieve high stability or electrical properties.

Semiconductor thermistors, used for surface sensing, are often sealed by coating them with glass or a non-porous ceramic or by sealing the bead or pellet type units in solid glass or non-porous probes or rods.

Thermistors which are used for surface sensing are preferably mounted by embedding them in an assembly which, in turn, is bolted, strapped, clamped or cemented to the surface whose environment it is desired to measure. When cycled over a wide temperature range, the potting compound generally separates from the assembly wall or the thermistor body or both, thereby causing severely reduced heat transfer between the thermistor and the surface to be measured.

Although there exists flexible or semi-flexible compounds which perform more satisfactorily than rigid materials, their use is frequently restricted by the upper (in excess of 300° C.) or lower (liquid $N_2$ to liquid He) temperature limit of the range in which the thermistor may be operated. The separations discussed which result in reduced heat transfer between the thermistor and sensing surface are due to differences in the coefficients of thermal expansion for the materials used. This reduction in heat transfer, in turn, results in a decrease in the dissipation constant of the thermistor which has the effect of increasing the self-heat error. It also results in greater measurement errors due to an increase in the temperature gradient between the thermistor and surface.

Another method for mounting thermistors which are used for surface sensing is to cement the thermistor(s) to the surface of an assembly (usually in the form of a metal or plastic plate; either flexible or, if rigid, shaped to conform to the surface geometry); the assembly is then bolted, strapped, clamped or cemented to the surface whose environment it is desired to measure. The problem associated with this method is similar to that previously discussed, in that the cement separates from either the thermistor or the assembly or both when cycled over a wide temperature range. once again, the use of flexible or semi-flexible cements provides more satisfactory performance than is obtainable with rigid cements. However, as with the case of potting compounds, their use is restricted by the upper or lower temperature limit of the range in which the thermistors may be operated.

Still another method for mounting thermistors which are used for surface sensing is to cement the thermistor directly to the surface whose environment is to be measured. This method is subject to the same disadvantage of that previously discussed in which the thermistor is cemented to the assembly. Actually, the problem may be more severe since the choice of surface material is predetermined.

Accordingly, it is an object of the present invention to provide a means for constructing and mounting thermistors to permit their use for sensing environmental changes on a surface over an extremely wide temperature range.

Another object of the present invention is to provide a thermistor mounting which will respond rapidly to changes in environmental conditions at a surface of a body.

Another object of the present invention is to provide a thermistor mounting which will exhibit improved heat transfer between the thermistor and the surface of a body and thereby reduce self-heating errors associated with the thermistor temperature measurements.

Still another object of the present invention is to provide a thermistor mounting which will provide a more accurate temperature measurement of the surface of a body when used over a wide temperature range by reducing the thermal gradient between the thermistor and the body surface.

Another object of the present invention is to provide a thermistor mounting which will remain mechanically rugged after exposure to wide temperature extremes.

A feature of the present invention is its use of a metal plate or assembly bonded directly to the glass sealing structure of the thermistor.

Another feature of the present invention is the use of a glass frit or compound which can connect the glass sealing structure of the thermistor to a metal plate or assembly which has a thermal coefficient of expansion different from that of the glass sealing structure of the thermistor.

Another feature of the present invention is its use of a non-porous ceramic coating or enclosure for the thermistor instead of glass coatings customarily used for hermetically sealing thermistors.

The invention consists of the construction, combination and arrangement of parts, as herein illustrated, described and claimed.

In one particularly desirable embodiment, this invention contemplates a surface temperature sensing assembly comprising in combination a thermistor, elestrical leads attached to said thermistor, a gas-tight non-metallic envelope surrounding said thermistor and the portions of said electrical leads attached thereto, and a metallic plate, said non-metallic envelope being fused to said metallic plate.

Referring now to the drawings:

FIGURE 5 is an end view partly in cross-section of an embodiment similar to that of FIGURES 3 and 4, with the difference that the metal plate, instead of being flat, constitutes one section of a flanged bracket or clamp assembly adapted to be mounted around a cylindrical pipe or the like.

Figure 1:
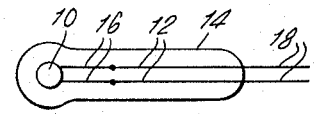
FIGURE 1 is a view in elevation of a conventional glass enclosed probe thermistor useful in preparing an assembly according to the present invention.

Referring now more particularly to FIGURE 1, the conventional probe thermistor comprises a ceramic thermistor bead 10, electrical leads 12 suitably attached to the thermistor, and a gas-tight glass envelope 14 surrounding thermistor 10 and portions of leads 12 attached thereto. The glass envelope 14 may suitably be made by inserting the thermistor and the leads into a short section of glass tubing, for example, that made by Corning Glass Co., and sold under the designations "0010" or "0012," and then collapsing the tubing by heating to form a solid glass probe. Leads 12 may suitably be made of more than one material, for example, primary leads 16 of platinum alloy wire or the like, which are connected directly to the thermistor, and extension leads 18 chosen to match the coefficient of thermal expansion of the glass. Suitable metals for the extension leads include for example, platinum wire, "Dumet," "Kovar," tungsten, Driver Harris "Alloy 152," etc., depending upon the cnefficient of expansion of the glass. Such probe thermistors and methods for making them are well known, and they may readily be obtained on the market.

Figure 2:
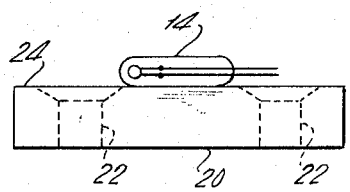
FIGURE 2 is a view in elevation of an assembly according to the present invention, made from the probe thermistor of FIGURE 1.

FIGURE 2 is a view in elevation of a temperature-sensing assembly according to the present invention, made using a glass enclosed probe thermistor such as that illustrated in FIGURE 1. In the apparatus as shown in FIGURE 2, there is provided a metal plate 20. Plate 20 is provided with bolt holes 22 for attaching the assembly to a surface whose temperature is to be measured. The upper surface 24 of plate 20 is preferably oxidized to facilitate fusion thereto of the glass envelope 14 surrounding the thermistor. Such oxidation may be accomplished by heating plate 20, or at least the upper surface 24 thereof, in an oxidizing atmosphere, or by treating it with a suitable oxidizing agent such as sodium dichromate solution or the like. The metal of which plate 20 is made is subject to a wide range of choice, so long as it will adequately withstand the conditions imposed by the environment in which it is to be used, and can be reasonably well matched as to coefficient of expansion by appropriate selection of the glass composition constituting envelope 14.

The sensing assembly according to the embodiment of FIGURE 2, is prepared by heating the metal plate 20 and the glass enclosed probe thermistor to the melting temperature of the glass and pressing the glass envelope into contact with upper surface 24 of the plate. This flattens the glass probe and increases the area of the mating surfaces. The assembly is then cooled, preferably at a slow rate to avoid development of internal stresses, to room temperature. Any internal stresses which result may be removed by proper annealing.

Figure 3:
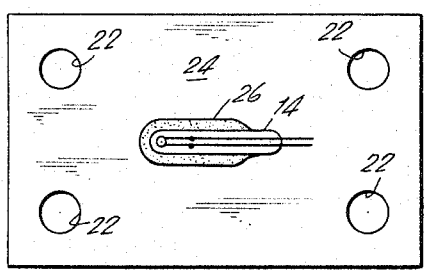
FIGURE 3 is a plan view of an assembly according to another embodiment of the invention, wherein a glass frit is interposed between the metal plate and the glass envelope surrounding the thermistor.
Figure 4:
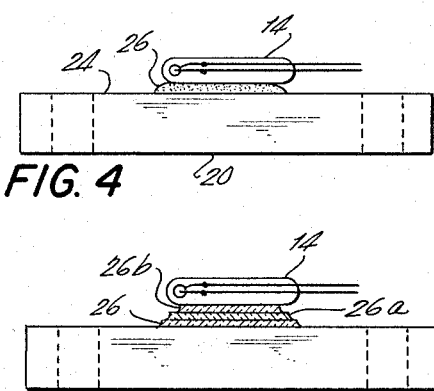
FIGURE 4 is a side elevation of the embodiment shown in FIGURE 3.

In cases where it is not practical or convenient to match the coefficient of expansion of glass envelope 14 with that of plate 20, the embodiment of the invention shown in FIGURES 3 and 4 may be used. This embodiment is similar to that shown in FIGURE 2, except that there is interposed between glass envelope 14 and plate 20 a layer of fused glass frit 26, having a coefficient of thermal expansion intermediate that of plate 20 and that of envelope 14. Glasses suitable for use as the intermediate layer 26 are well known in the art, for example, the various uranium glasses.

In the manufacture of the embodiment of FIGURES 3 and 4, it is convenient to position a small quantity of the powdered frit, disposed in a suitable binder on the surface of plate 20, lay the glass enclosed probe thermistor thereon, and raise the temperature of the entire assembly to a point such that the glass of envelope 14 is softened and the frit is fused, and then cool the whole assembly slowly, leaving the frit fused to the surface 24 of the plate, and the glass envelope 14 fused to the layer of frit, as best shown in FIGURE 4.

Figure 5:
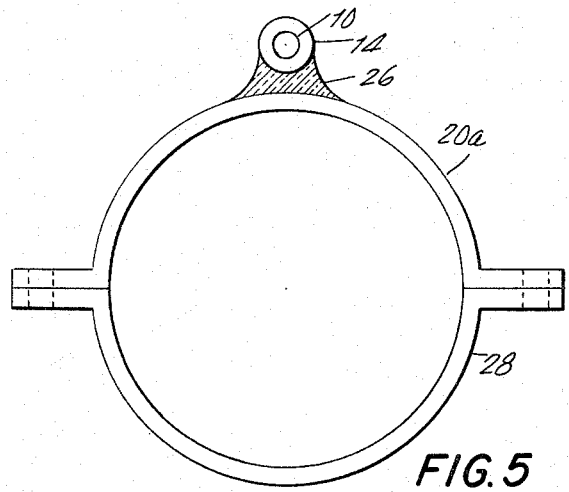

The metal plate need not be a flat one, it may be shaped in any desired manner so as to conform with the contour of the surface of which the temperature is to be measured. FIGURE 5 illustrates an embodiment in which the plate 20ª is curved and flanged to constitute one-half of a clamp assembly, together with another curved, flanged plate 28. Such a clamp is suitable for attachment to a pipe or the like, to sense changes in the surface temperature thereof corresponding to changes in the temperature of a liquid flowing through the pipe.

In the embodiments of FIGURES 3, 4 and 5, as well as in other embodiments employing intermediate layers of glass between the metal plate and the thermistor envelope, it is convenient, but not essential, to employ the intermediate layer in the form of a frit. If desired, it may instead be applied as a solid piece of glass which is fused to the oxidized upper surface 24 of the metal plate. The glass thermistor envelope may be fused to the intermediate layer in the same operation or in a separate, subsequent step.

Figure 6:
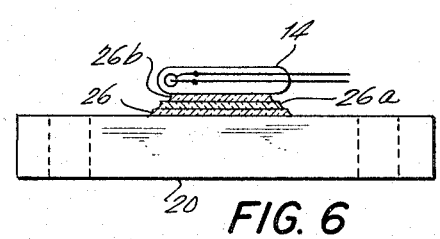
FIGURE 6 is a side elevation similar to FIGURE 4, partly in cross-section, but showing an embodiment wherein a plurality of intermediate glasses are used in forming the seal between the thermistor envelope and the metal plate.

As shown in FIGURE 6, a plurality of intermediate glass layers 26, 26ª, 26ᵇ, having graduated coefficients of thermal expansion may be used in cases where it is necessary to provide a more gradual transition between the coefficient of the glass envelope 14 and the metal plate 20. This embodiment is particularly useful where the mismatch between the coefficient of expansion of the glass envelope and that of the metal plate is too great to be compensated by a single intermediate layer.

Figure 7:
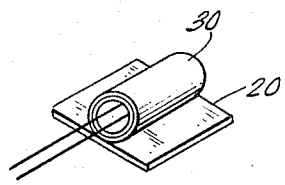
FIGURE 7 shows in perspective, another embodiment of the invention, wherein the thermistor and its envelope are contained in a section of metal tubing provided with a longitudinal flange serving as the metal plate.

FIGURE 7 illustrates another embodiment of the invention, wherein the glass enclosed thermistor is surrounded by a protective shield 30 of metal, preferably the same metal as that used for the metal plate 20. Shield 30 may be soldered, welded or brazed to plate 20 either before or after the insertion of the glass enclosed thermistor in the shield, or it may be formed integrally with plate 20.

To prepare the embodiment of the invention shown in FIGURE 7 it is convenient to close one end of the shield (the far end, as shown in FIGURE 7), insert the thermistor with its leads projecting out the other end, as shown, and heat the assembly to fuse the glass to the interior of the shield. Such heating is preferably carried out in a vertical position, with the leads projecting upwardly, so that the glass tends to fill the shield completely and fuse to all parts of the interior of the shield, ensuring optimum transfer of heat from plate 20 to the thermistor. In appropriate cases, an intermediate layer can be employed in this embodiment of the invention, by centering the glass enveloped thermistor probe in the shield, surrounding it with powdered frit, and heating the entire assembly to melt the frit and at least soften the glass, so that the frit is fused simultaneously to the interior of the shield and the surface of the glass thermistor envelope.

Figure 8:
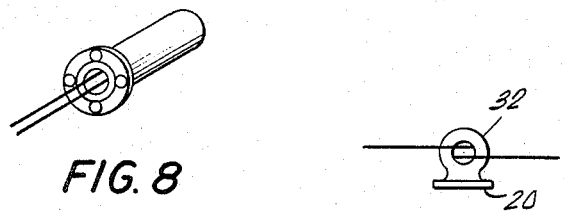
FIGURE 8 shows, in perspective, still another embodiment of the invention, wherein the thermistor and its envelope are contained in a tubular metal cup having a peripheral flange.

FIGURE 8 shows an embodiment similar to that of FIGURE 7, except that the flange is a circular flange projecting radially from the periphery of one end of the shield, rather than a flat plate tangent to the shield. In the embodiment of FIGURE 8, the far end of the shield is preferably closed so that the shield is in the form of a cup. When so constructed, the assembly is particularly suitable for use as a probe or plug, to be inserted through an appropriate aperture in the wall of a tank or the like, to sense the temperature of the material contained therein. When the assembly is so used, the entire exposed surface of the shield 30 functions as the metal plate and participates in the transfer of heat between the environment to be measured and the thermistor. The assembly according to FIGURE 8 may be manufactured in substantially the same manner as that of FIGURE 7.

Figure 9:
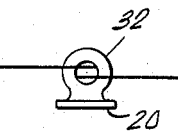
FIGURE 9 shows, in side elevation, still another embodiment of the invention, wherein the envelope is a coating of aluminum oxide or other suitable ceramic, fused in place about the thermistor, and simutlaneously fused to a metal plate.

FIGURE 9 shows another embodiment of the invention, in which the material enveloping the thermistor element is a ceramic 32 instead of a glass, the ceramic being fused or sintered directly to the metal plate, or by way of an intermediate ceramic-to-metal sealing material. One convenient way of effecting the seal between the ceramic envelope and the metal plate is to metallize the surface of the ceramic to produce a deposit of appropriate metal thereon, and then join the metal deposit on the envelope to the metal plate by soldering, brazing, or other appropriate technique depending on the metals involved. Suitable metals for metallizing the surface of the ceramic include copper, aluminum, and noble metals such as gold, silver, platinum and the like. They may be deposited on the surface of the ceramic envelope by cathode sputtering, for example, or by other appropriate techniques known to the art.

It will be understood that FIGURE 9 is merely exemplary, and that the embodiments of FIGURES 1-8, also may be made using thermistors enclosed in gas-tight ceramic envelopes instead of glass envelopes.

The temperature sensing assemblies according to the present invention are useful in the measurement of temperatures over very wide ranges, they respond rapidly to environmental changes, and provide improved heat transfer betweeen the thermistor and the body to be measured. They exhibit improved accuracy, and remain mechanically rugged despite repeated exposure to extremes of temperature.

While this invention has been described in terms of certain preferred embodiments and illustrated by way of certain drawings, these are illustrative only, as many alternatives and equivalents will readily occurs to those skilled in the art, without departing from the spirit or proper scope of the invention. The invention is therefore not to be construed as limited, except as set forth in the appended claims.

What is claimed is:

1. A temperature sensing assembly comprising in combination a thermistor, electrical leads attached to said thermistor, a gas-tight non-metallic envelope surrounding said thermistor and extending portions of said electrical leads attached thereto, and a metallic plate tangent to the envelope, said non-metallic envelope being fused to said metallic plate by way of at least one intermediate layer of glass, said intermediate layers of glass having a coefficient of thermal expansion intermediate the coefficients of thermal expansion of said non-metallic envelope and said metallic plate, which said non-metallic envelope and metallic plate have substantially different coefficients of thermal expansion.

2. A temperature sensing assembly according to claim 1, wherein a plurality of intermediate layers of graduated coefficients of thermal expansion are interposed between said non-metallic envelope and said metallic plate.

3. A temperature sensing assembly according to claim 1, wherein said envelope is a non-porous ceramic envelope.

4. A temperature sensing assembly according to claim 3, wherein said ceramic envelope is at least partially coated with metal, and said ceramic envelope is joined to said metallic plate by joining said metal coating to said plate.

5. A temperature sensing assembly according to claim 1, wherein said metallic plate is shaped to conform with the contour of a surface of which the temperature is to be measured.

6. A temperature sensing assembly according to claim 1, wherein said gas-tight non-metallic envelope is enclosed in a metal shield.

7. A temperature sensing assembly according to claim 6, wherein said shield and said metallic plate are a single element in the nature of a metal housing surrounding said non-metallic envelope.

8. A temperature sensing assembly according to claim 2, in which the intermediate layers are formed of powdered glass frit.

References Cited

UNITED STATES PATENTS

| | | | |
|---|---|---|---|
| 2,280,257 | 4/1942 | Pearson | 338—23 |
| 2,332,596 | 10/1943 | Pearson | 338—23 |
| 2,405,192 | 8/1946 | Davis | 338—316 |
| 2,407,288 | 9/1946 | Kleimack et al. | 338—23 |
| 2,414,792 | 1/1947 | Becker | 338—22 |
| 2,462,162 | 2/1949 | Christensen et al. | 338—22 |
| 2,966,646 | 12/1960 | Baasch | 338—22 |
| 3,196,629 | 7/1965 | Wood | 338—22 |
| 3,219,480 | 11/1965 | Girard | 338—22 |
| 3,245,018 | 4/1966 | Russell | 338—2 |

RICHARD M. WOOD, *Primary Examiner.*

W. D. BROOKS, *Assistant Examiner.*